United States Patent [19]

Hensley

[11] 4,233,816
[45] Nov. 18, 1980

[54] CRYOGENIC FLUID TRANSFER LINE

[75] Inventor: Steve L. Hensley, Columbus, Ohio

[73] Assignee: Pennwalt Corporation, Philadelphia, Pa.

[21] Appl. No.: 64,657

[22] Filed: Aug. 8, 1979

[51] Int. Cl.³ .................................................. F17C 7/02
[52] U.S. Cl. ......................................... 62/55; 138/112; 138/113
[58] Field of Search ..................... 62/55; 138/111, 112, 138/113, 114

[56] References Cited

U.S. PATENT DOCUMENTS

| | | | |
|---|---|---|---|
| 1,891,740 | 12/1932 | Westerman | 138/165 |
| 3,055,399 | 9/1962 | Bush et al. | 138/157 |
| 3,459,234 | 8/1969 | Richter et al. | 138/156 |
| 3,466,886 | 9/1969 | Doose et al. | 62/55 |
| 3,686,422 | 8/1972 | Doose | 62/55 |
| 3,904,394 | 9/1975 | Prast et al. | 62/55 |
| 3,986,341 | 10/1976 | DeHaan | 138/127 |
| 3,992,169 | 11/1976 | Loudon | 138/112 |
| 4,036,618 | 7/1977 | Leonard et al. | 138/148 |

Primary Examiner—Ronald C. Capossela
Attorney, Agent, or Firm—Charles N. Quinn

[57] ABSTRACT

A cryogenic fluid transfer line is provided which comprises an interior conduit for passage therethrough of cryogenic fluid, an exterior conduit concentrically spaced about the interior conduit and defining the exterior of the fluid transfer line, an annular heat transfer shield generally concentric with and interjacent to the interior and exterior conduits and including at least one longitudinally extending resilient arcuate member with a longitudinally extending generally arcuate hooking edge, at least one longitudinally extending resilient arcuate member with a longitudinally extending generally arcuate catching edge, where the hooking and catching edge members are interlockingly engageable with each other when the member including the hooking edge is flexed to a smaller arcuate radius, positioned with its hooking edge inboard of the catching edge and then permitted to relax, each set of engaged hooking and catching edges defining a hollow generally cylindrical nest having a substantially closed curved surface with each nest extending longitudinally substantially the length of the shield, with the shield further including longitudinally extending heat transfer conduits resident within each nest. Radiation shields are provided between the annular heat transfer shield and the interior and exterior conduits.

6 Claims, 6 Drawing Figures

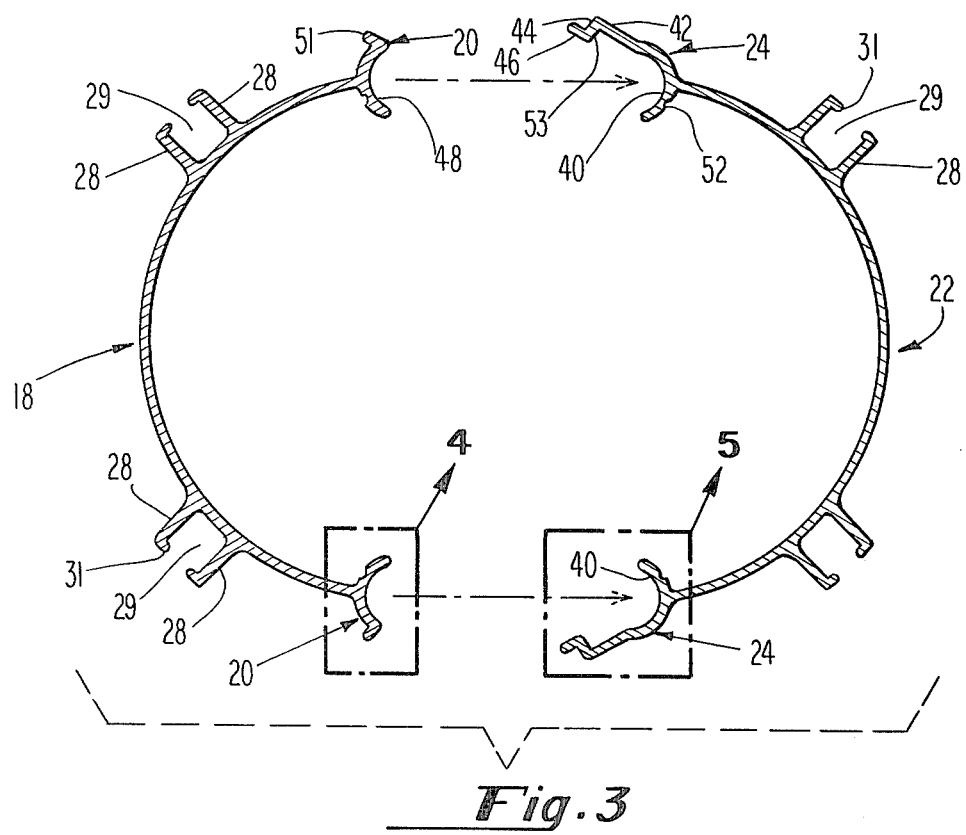
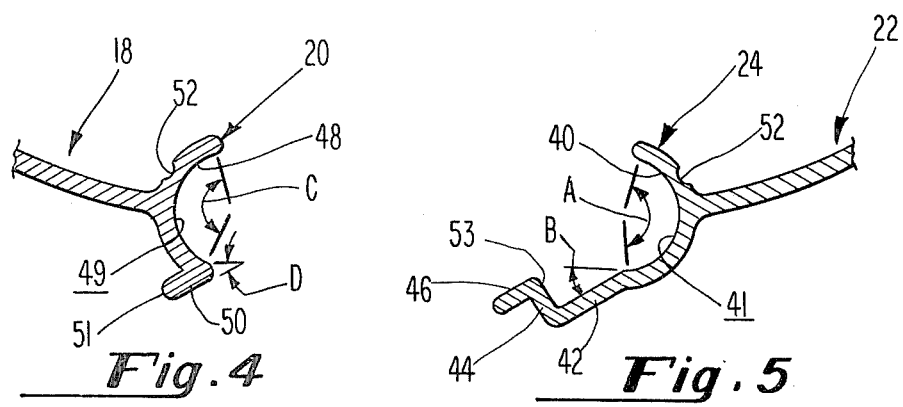

CRYOGENIC FLUID TRANSFER LINE

BACKGROUND OF THE INVENTION

1. Field of the Invention

This invention relates to conduits used to transport cryogenic fluids.

2. Description of the Prior Art

U.S. Pat. No. 3,904,394 discloses a fluid transfer line having transport tubes suspended within a polymeric radiation shield by nylon wires. Cooling tubes outside the radiation shield, one cooling tube thermally connected to the shield by a heat conductive paste inside a copper foil envelope and a second cooling tube outside the copper foil envelope urging the copper foil envelope against the exterior of the first cooling tube, maintain the radiation shield at a low temperature via fluid transport through the cooling tubes. The entire assembly is enveloped by a gauze-mylar blanket and suspended within a stainless steel tube at selected intervals.

U.S. Pat. Nos. 3,986,341; 3,992,169 and 4,036,618 share a common disclosure which shows both rigid and flexible sections of a cryogenic transport line. A refrigerant line is provided outside of aluminum foil which surrounds a transport conduit. The refrigerant line is not rigidly connected to either the aluminum foil and mylar positioned between the refrigerant line and the transport conduit or to the inner transport conduit; this results in a sliding shield assembly about the inner transport conduit. The aluminum foil and mylar in concentric layers yield the sliding shield insulating the transport conduit. The entire assembly is encased with a carbon steel jacket. Expansion joints utilize stainless steel bellows within the inner transport conduit. The inner transport line and the intermediately spaced refrigerant lines are supported by two concentric aluminum rings connected by fiberglass spokes, with the fiberglass projections extending off the aluminum rings to support the refrigerant lines. The outer ring is spaced away from the interior of the outer housing by fiberglass spokes to provide only point contact between the ring and the housing.

U.S. Pat. No. 1,891,740 discloses a method for producing an extruded one-piece object having an open perimeter which becomes a closed perimeter when two complemental mating portions are snapped together.

U.S. Pat. No. 3,459,234 discloses a tubular assembly formed of two interlocking members which, when assembled, have a raceway extending longitudinally therealong, interior of the tube. The raceway is open to allow sail keepers to move slidably therealong. Teeth on the interlocking members effectively prevent disengagement.

U.S. Pat. No. 3,055,399 discloses an elongated hollow conduit formed of two pieces having overlaping margins, with the margins provided with and aligned by longitudinally extending grooves and thereafter being bonded together with epoxy to define the conduit.

The prior art fails to disclose a cryogenic fluid transfer line which can be easily and quickly assembled without substantial amounts of welding and necessarily associated high labor costs.

SUMMARY OF THE INVENTION

This invention provides a cryogenic fluid transfer line which is rapidly assemblable in long segments and does not require a large amount of handwork or welding to fabricate. The line includes an interior conduit for passage therethrough of the cryogenic fluid, an exterior conduit concentrically spaced around the interior conduit and defining the exterior of the line, an annular heat transfer shield generally concentric with and interjacent to the interior and exterior conduits, comprising at least one longitudinally extending resilient arcuate member including a longitudinally extending generally arcuate hooking edge, at least one longitudinally extending resilient arcuate member including a longitudinally extending generally arcuate catching edge, with the hooking and catching edge members being interlockingly engageable with each other when the member including the hooking edge is flexed to a smaller radius, positioned with the hooking edge disposed inwardly of the catching edge and then relaxed, with each set of engaged hooking and catching edges defining a hollow generally cylindrical nest having a substantially closed curved surface, with each nest extending longitudinally substantially the length of the shield and with the shield further including a generally longitudinally extending heat transfer conduit resident within each nest and retained therewithin by pressure circumferentially exerted radially inwardly on the conduit by the portions of the engaged arcuate hooking and catching edges which define each nest. Insulative spacers and shields are provided for retaining the annular shield interjacent the interior and exterior conduits and for insulating the interior conduit and the annular shield with respect to the transport line exterior.

BRIEF DESCRIPTION OF THE DRAWINGS

FIG. 3 is a view showing the structure of FIG. 2 disassembled.

FIGS. 4 and 5 are enlarged details of portions of the structure depicted in FIG. 3, as denoted by the rectangular boxes in FIG. 3.

DESCRIPTION OF THE PREFERRED EMBODIMENTS

Figure 1:
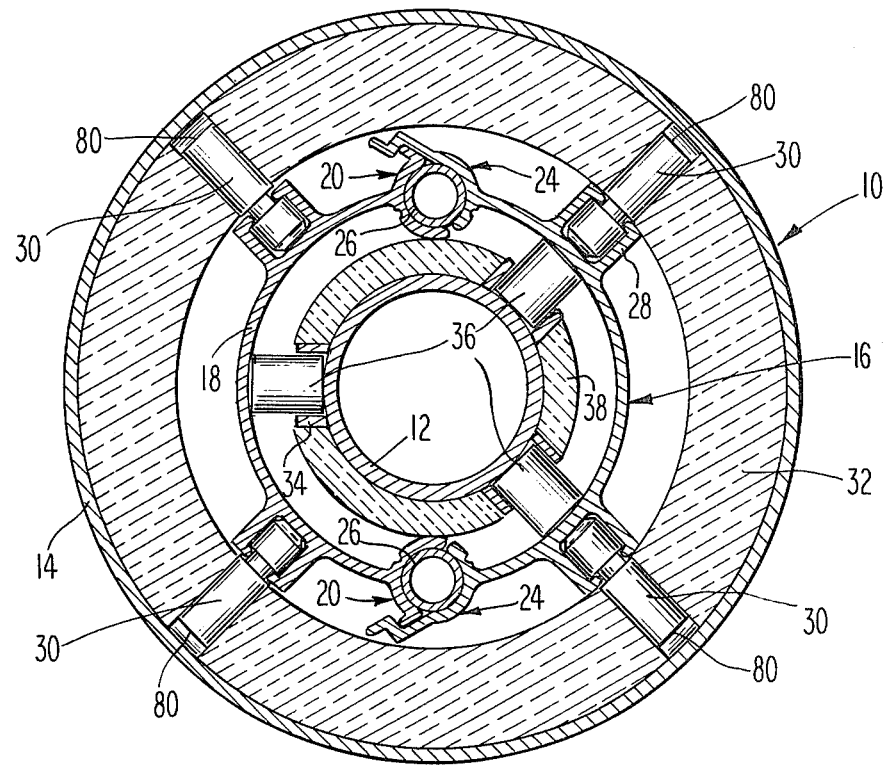
FIG. 1 is a sectional view of a preferred embodiment of the invention.

Referring now to the drawings in general and to FIG. 1 in particular, the cryogenic fluid transfer line is shown in a preferred embodiment in sectional view and is designated generally 10. The line includes an interior conduit 12 for passage therethrough of the cryogenic fluid of interest, such as liquid or gaseous helium. An exterior conduit 14 is concentrically spaced from and about interior conduit 12 and defines the exterior of cryogenic fluid transfer line 10. An annular heat transfer shield is designated generally 16 and is generally concentric with and interjacently spaced between interior and exterior conduits 12 and 14. Annular heat transfer shield 16 is preferably comprised of a longitudinally extending resilient arcuate member 18 which includes a longitudinally extending generally arcuate hooking edge denoted generally 20 and a second longitudinally extending arcuate member 22 having an arcuate catching edge denoted generally 24; longitudinally extending arcuate members 18 and 22 and their hooking and catching edges 20 and 24 are best illustrated in FIGS. 2, 3, 4 and 5.

Figure 2:
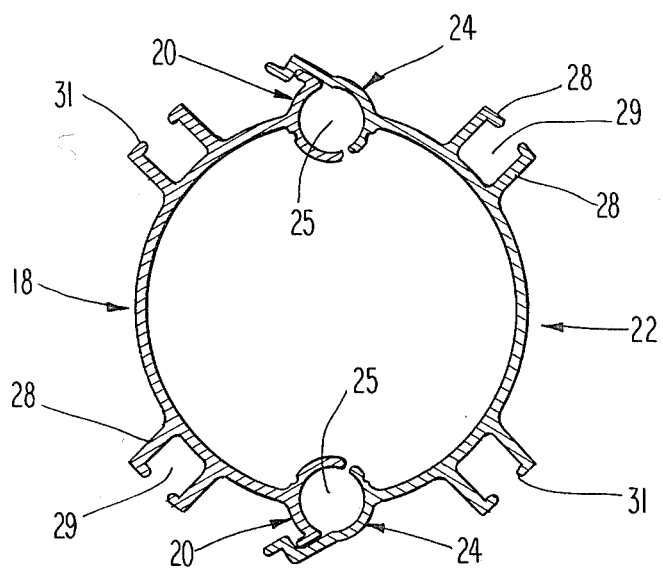
FIG. 2 is a sectional view of part of the annular heat transfer shield portion of the cryogenic fluid transfer line depicted in FIG. 1.

As best shown in FIGS. 1 and 2, the two longitudinally extending arcuate members 18 and 22 are interlockingly engageable by engagement of a hooking edge 20 with a catching edge 24. When the two arcuate members are engaged, each pair of edges defined by a hooking edge 20 and a catching edge 24 forms a nest 25 in which a longitudinally extending heat transfer conduit 26 resides. Conduits 26 are retained within each nest by pressure exerted around the circumference thereof, in a radially inward direction, by portions of the engaged hooking and catching edges 20 and 24 which define the nest 25. Each nest 25 is preferably slightly smaller than the outer diameter of heat transfer conduit 26, to define an interference fit therebetween so that heat transfer conduit 26 is securely retained in place.

Pairs of lugs 28 extend outwardly from the exterior of arcuate members 18 and 22 and form channel receptacles 29 for heat insulative spacers 30 which preferably are formed from a heat insulative material such as Micarta. (Micarta is a trademark of General Electric Company for solid glass fibre-filled phenolic resin.) Spacers 30 are of generally rectangular configuration with a pinched-in waist portion, not numbered, which receives a nipple 31 formed in the portions of lugs 28 remote from arcuate members 18 and 22. Nipple 31 fits into the pinched waist of spacers 30, to radially afix spacers 30 with respect to arcuate members 18 and 22. When placed in the channel receptacles 29 the spacers 30 are slidable along the longitudinal length of channel receptacles 29. When desired to fix the spacers 30, the lugs 28 may be pinched with pliers about spacers 30 thereby securing the spacers in place. Spacers 30 are formed with a slight radius defining the surface of the spacers which is remote from and faces outwardly away from shield 16 and abuts the interior of conduit 14. The radius defining the spacer ends is formed in an arc perpendicular to the plane of the paper of the drawing figures. The arcs defining the outwardly facing ends of spacers 30 form parts of circles which, if drawn, would define planes parallel to the longitudinal axis of the cryogenic heat transfer line. This assures that only point contact exists between spacers 30 and conduit 14, to minimize conductive heat transfer therebetween. Corners 80, appearing as straight lines in FIG. 1, define the juncture between the slightly rounded curved spacer ends, which contact conduit 14, and the radially extending generally flat side portions of the generally rectangularly configured spacers 30. The slightly-rounded ends of spacers 30 remote from lugs 28 contact the interior of conduit 14, thereby positioning shield 16 and the structure connected thereto in place, in fixed position with respect to the interior of conduit 14. Radiation shields, preferably formed of alternate layers of aluminized Mylar and Dexter paper, are denoted 32; these shields are concentric with exterior conduit 14 and are interposed between conduit 14 and shield 16 to block radiation heat transfer from the interior surface of conduit 14 to annular shield 16. "Mylar" is a trademark of the E. I. duPont de Nemours & Co. Suitable aluminized Mylar is available from National Metalizing Company in Cranberry, New Jersey. "Dexter paper" is available from C. H. Dexter Company in Hartford, Connecticut. Normally about sixteen layers of Mylar and sixteen alternating layers of Dexter paper are used. More layers may be used when heat leak requirements are unusually severe. The alternating layers of Mylar and Dexter paper may be prepared as batts and installed between conduit 14 and annular shield 16, in the areas longitudinally removed from spacers 30 in the area immediately around spacers 30, the alternate layers are wrapped in a spiral fashion; hence no portion of annular shield 16 can "see" conduit 14.

Tack welded about the exterior of conduit 12 are feet 34, cut from a tubular section, and which, with the curved exterior of conduit 12, define receptacles for heat insulative tubular spacer means 36 which retain conduit 12 within and spaced at a fixed position away from annular shield 16. Ends of tubular spacers 36 remote from feet 34 abut the interior of shield 16 and thereby maintain interior conduit 12 in a fixed spaced disposition from shield 16. The tubular configuration of spacers 36 assures that, at most, line contact exists between the spacers 36 and the curved inner surface of arcuate members 18 and 22. Positioned around conduit 12 are radiation shields, which are preferably formed of alternate layers of aluminized Mylar and Dexter paper; the radiation shields as a group are denoted 38. Similarly to the radiation shields between shield 16 and conduit 14, the shields between shield 16 and conduit 12 may be prepared as batts and installed between shield 16 and conduit 12 in the areas longitudinally removed from spacers 36. Shields 38 are preferably formed in the same spiral-wrapped manner as shields 32 in the neighborhood of spacers 36, and, like shields 32, normally are provided as about 16 layers of aluminized Mylar and 16 layers of Dexter paper, with the layers alternating. Hence interior conduit 12 cannot "see" annular shield 16.

Figure 6:
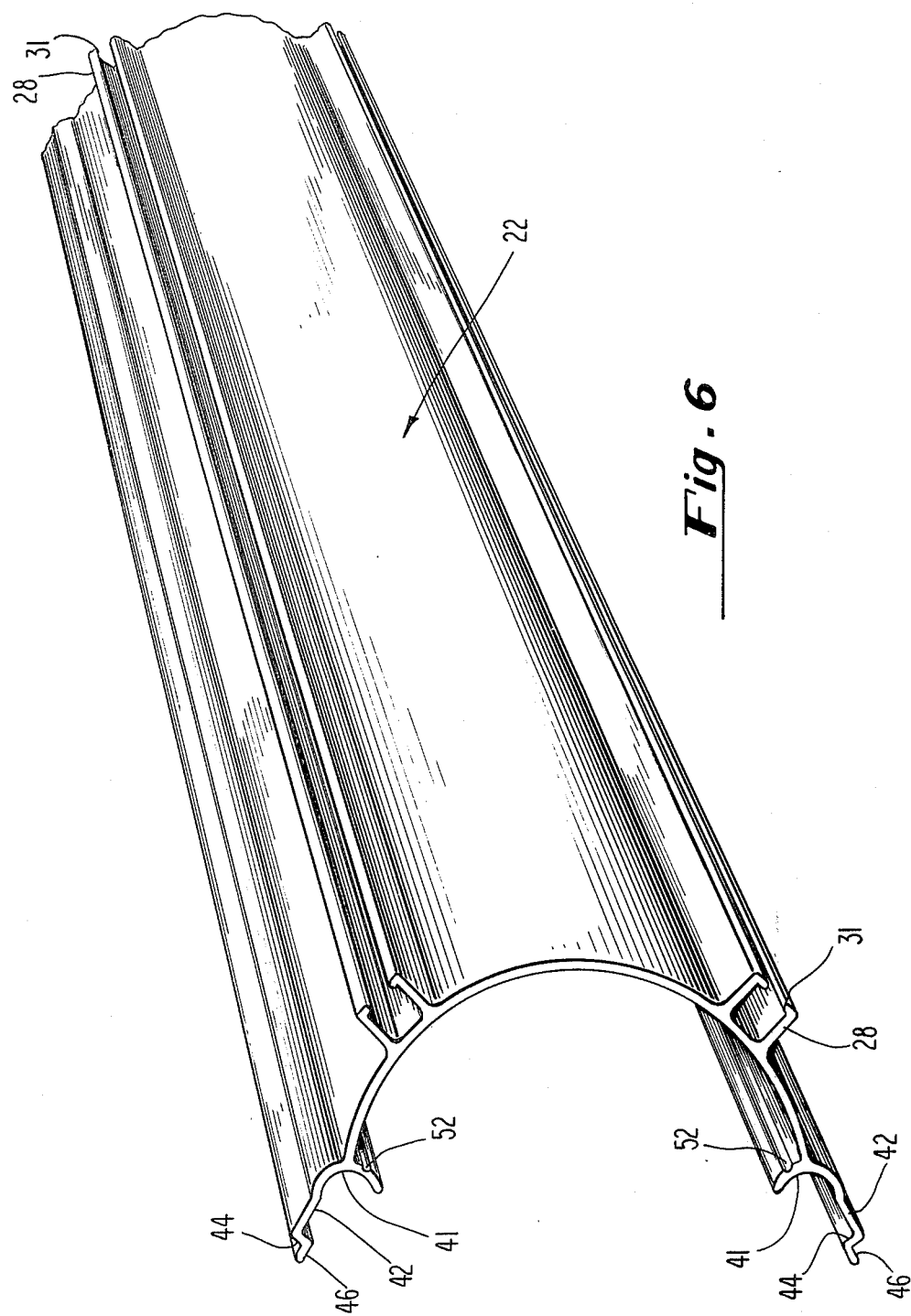
FIG. 6 is a perspective view of the right-hand half of the portion of the annular heat transfer shield depicted in FIGS. 2 and 3.

Unlike lugs 28 which extend the entire longitudinal length of their associated arcuate members 18 or 22, as shown in FIG. 6 with respect to arcuate member 22, feet 34 are positioned on the exterior of conduit 12 only intermittently along the longitudinal length of the conduit. Shields 38 thus can be positioned about the exterior of conduit 12 quite proximate to the exterior surface, around the exterior of spacers 36 so spacers 36 seem to protrude through shields 38. Shields 32 however are positioned exteriorly of lugs 28 since lugs 28 extend along the longitudinal length of arcuate members 18 and 22; wrapping of shields 32 in the neighborhood of spacers 30 is done around the exterior of spacers 30 so spacers 32 protrude slightly from the outermost layer of shields 32 to facilitate contact with the interior surface of exterior conduit 14.

Arcuate catching edge 24 is extruded as a part of associated arcuate member 22 and includes an arcuate portion 40 which defines a circularly concave face 41 in a longitudinally extending edge of arcuate member 22 where concave face 41 subtends an angle, denoted A in FIG. 5, of less than one hundred eighty degrees. "Circularly concave" means that the concave face 41 is preferably formed on a substantially uniform radius and, when viewed in section, appears substantially as an arc of a circle. Extending away from arcuate portion 40 and defining a terminus of concave face 41 is a first tab portion 42 which extends from arcuate portion 40 at an oblique angle to concave face 41. This angle is denoted B in FIG. 5. Transversely extending from tab portion 42, at the end thereof remote from concave face 41 and extending from tab 42 on the same side as concave face 41 is a bumper portion 44. Extending away from bumper portion 44 at the end thereof remote from first tab portion 42 is angle portion 46 disposed generally parallel to first tab 42. Angle portion 46 extends away from bumper portion 44 in the opposite direction from first tab 42.

Hooking edge 20, similarly to catching edge 24, is extruded as a portion of an associated arcuate member 18 and comprises an arcuate portion 48 defining a circularly concave face 49 in a longitudinally extending edge of arcuate member 18, with concave face 49 so defined having a radius substantially the same as concave face 41 defined by arcuate portion 40 of catching edge 24. The concave face 49 defined by arcuate portion 48 subtends an angle less than that subtended by arcuate portion 40 of catching edge 22; the angle subtended by concave face 49 is denoted C in FIG. 4. A second tab 50 defines a terminus of arcuate portion 48 and extends outwardly away from arcuate portion 48 at an angle thereto which is substantially the same as the oblique angle B at which first tab extends away from arcuate portion 40 of catching edge 24; this angle is denoted D in FIG. 4.

When hooking and catching edges 20 and 24 are engaged, second tab 50 is in contiguous sliding contact with first tab 42 and abuts bumper portion 44 extending from first tab 42; this is best seen in FIG. 2 where some of the numbers have been omitted from the component parts of the hooking and catching edges, especially the tab and bumper portions, to insure clarity of the drawing. Each pair of circularly concave faces 41 and 49 defined by a hooking and catching edge combination 20 and 24 define a nest 25 which is hollow and generally cylindrical with a substantially closed curved interior surface. The nests 25 extend longitudinally substantially the length of annular shield 16. "Substantially closed curved surface" means that the two curved circularly concave arcuate portions 40 and 48 of the catching and hooking edges when engaged form a nearly completely closed circle defining the nest. This configuration of the nest, wherein the convex faces of each pair of hooking and catching edges defining together a nest subtend an angle of only slightly less than three hundred sixty degrees, assures that a substantial portion of the exterior of the heat transfer conduit is in contact with the nest, to provide excellent conductive heat transfer between the heat transfer conduit 26 and the annular heat transfer shield 16. Semi-circular cutouts 52 in the exterior portions of hooking and catching edges 20 and 24, in the edge surfaces facing oppositely from concave faces 41 and 49, allow flexure of the hooking and catching edges when the edges are interlockingly engaged.

Annular heat transfer shield 16 is assembled by urging arcuate member 18 towards arcuate member 22 in the direction illustrated arrows in FIG. 3. As these two members are urged together, a slight radially inwardly directed force may be applied to arcuate member 18 to urge it to flex to a slightly smaller radius. This allows second tab portions 50 of hooking edges 20 to clear angle portions 46 and bumper portions 44 of catching edges 24. Once second tab portions 50 are to the right of bumper portions 44 as viewed in FIG. 3, arcuate member 18 is allowed to relax. As member 18 relaxes and increases slightly in radius, second tab portions 50 move radially outwardly and contact first tab portions 42. Second tab portion 50 then moves slideably along first tab portion 42 until second tab portion 50 abuts bumper portion 44 which then retains second tab portion 50 in position.

Even if no force is applied to flex arcuate member 18 to a slightly smaller radius when arcuate members 18 and 22 are urged together, when member 18 is urged against member 22 in the direction shown by the arrows in FIG. 3, members 18 and 22 still interlockingly engage. When second tab portions 50 of arcuate member 18 contact angle portions 46, second tab portions 50 slide along angle portions 46 towards the right as viewed in FIGS. 3, 4, and 5, until second tab portion has tranversed the length of angle portion 46 to where angle portion 46 joins bumpers 44. Tab portions 50 then move along bumpers 44, with rounded ends 51 of tab portions 50 moving slideably along the inwardly facing surface 53 of bumpers 44 until second tab portions 50 come to rest contiguous with first tab portions 42.

Disengagement of arcuate members 18 and 22 may be effected by flexing arcuate member 18 to slightly reduce the radius thereof whereupon second tabs 50 move radially inwardly until their rounded ends 51 can clear bumper portions 44 when arcuate member 18 is moved to the left as viewed in FIG. 3.

The extruded nature of arcuate members 18 and 22 is best illustrated in FIG. 6 where member 22 is shown in perspective. Both members 18 and 22 are extruded, preferably of a resilient material such as aluminum, so that the members are formed in a single piece with no welding or other hand operation required for fabrication thereof. Once members 18 and 22 are formed, they can be easily snapped together around heat transfer conduits 26, which are preferably a malleable metal such as copper, with heat transfer conduits 26 then securely engaged in nests 25 formed by hooking and catching edges 20 and 24 of arcuate members 18 and 22. Aluminum is advantageously used to fabricate arcuate members 18 and 22 which form a substantial portion of annular shield 16 not only because aluminum can be easily extruded but also because aluminum is a good heat conductor which assures that the temperature of annular shield 16 will always be substantially close to that of the shield fluid flowing through conduit 26. The interior conduit 12 is conventionally stainless steel as is the exterior conduit 14.

When the cryogenic fluid transfer line is assembled, the line is first constructed in segments, with each segment being the length of arcuate members 18 and 22. Assembly of a segment begins as tubular feet 34 are tack welded to the exterior of conduit 12. Tubular heat insulative spacers 36 are positioned in feet 34 and the alternating layers of aluminized Mylar and Dexter paper defining shields 38 are positioned around the exterior of conduit 12. This assembly is then placed within one of the two arcuate members, 18 or 22, which form the annular heat transfer shield 16. Copper tubing 26 is positioned in the portions of nests 25 defined by concave faces of the annular hooking or catching edges associated with the arcuate member into which the assembly of inner conduit 12 has been positioned. The complementary half of the annular shield, i.e. the remaining arcuate member 18 or 22, is then snapped over copper tubes 26 resident in nests 25 and over the interior conduit 12 assembly which had previously been placed in the other half of the annular shield. Spacers 30 are then slid into the channels defined by lugs 28 and alternating layers of aluminized Mylar and Dexter paper are positioned around the exterior of annular heat transfer shield 16. This entire assembly is then slid into exterior conduit 14 Subsequently, end connections are made so that each segment of cryogenic heat transfer line can be joined at its ends to the adjacent segments of line as required. Bayonet connections, welding, threaded connections and the like can be used for such joints.

In one embodiment the concave circular faces have been formed on a 0.367 inch diameter circle while the heat transfer conduit 26 has been a 0.375 inch outside diameter copper tube; hence, when the extruded members 18 and 22 are snapped together the nests have effectively continuous contact with heat transfer conduit 26 so that good heat transfer between conduit 26 and shield 16 is effected.

During operation the cryogenic transfer line normally carries the cryogenic fluid interest, typically liquid of gaseous helium, within interior conduit 12. A vacuum is maintained within exterior conduit 14, to minimize convective heat transfer itno interior conduit 12. A very low temperature shielding liquid or gas, typically liquid nitrogen, is fed through conduit 26; with good heat transfer between conduits 26 and shield 16 this assures that the entirety of shield 16 is maintained at approximately the temperature of the shielding liquid or gas fed through conduit 26. This low temperature of shield 16 assures that minimal heat is transferred to interior conduit 12.

The extruded members 18 and 22 have been fabricated in lengths up to forty (40) feet. The transfer line has been fabricated in forty (40) foot length segments corresponding to these lengths of the extruded members 18 and 22. Other than tack welding the feet, which hold spacers 36 to conduit 12, no welding of a transfer line segment as disclosed herein is required. This snap-together construction allows the line segments to be fabricated much more quickly than cryogenic transfer lines known heretofore. Labor savings of from five to seven dollars ($5.00-7.00) per fabricated foot length of transfer line segment have been estimated. (It may be necessary, however to weld inlet or outlet couplings to conduits 26 and/or to weld vacuum fitings to exterior conduit 14 in some segments of the transfer line, especially when a plurality of connected segments are used to transfer cryogenic fluid over a significant distance. Also, ends of the line must be welded closed and, if inner conduit lengths are less than the total line length, welding of the inner conduit section may be required. In any event, construction of transfer line, particularly of transfer line segments, disclosed herein certainly minimizes the amount of welding required.)

The invention is not limited to embodiments utilizing two extruded arcuate members forming the annular heat transfer shield, where one of the arcuate members has two hooking edges and the second arcuate member has two catching edges. Three or more arcuate members could be used to form the annular heat transfer shield. Moreover, the arcuate members could be formed with some or all of the members having both a hooking edge and a catching edge. Also, arcuate members could be provided with hinges via which contiguous arcuate members were connected at one set of edges, with the members connected at their other edges by hooking and catching edges of the type disclosed herein. Also, the interior and exterior conduits need not be stainless steel, the annular heat transfer conduit need not be aluminum, the heat transfer conduit need not be copper, the spacers need not be Micarta and radiation shields need not be alternate layers of aluminized Mylar and Dexter paper; other workable materials of suitable heat transfer and heat insulative character and having the requisite strength at the cryogenic temperatures of interest could be substituted.

I claim the following:

1. A cryogenic fluid transfer line comprising:
   (a) an interior conduit for passage therethrough of cryogenic fluid;
   (b) an exterior conduit concentrically spaced about said interior conduit, defining the exterior of said line;
   (c) an annular heat transfer shield generally concentric with and interjacent to said interior and exterior conduits, comprising:
      1. at least one longitudinally extending resilient arcuate member including a longitudinally extending generally arcuate hooking edge;
      2. at least one longitudinally extending resilient arcuate member including a longitudinally extending generally arcuate catching edge;
   said hooking and catching edge members being interlockingly engageable with each other when said member including the hooking edge is flexed to a smaller arcuate radius, positioned with said hooking edge disposed inwardly of said catching edge, and then relaxed; each set of engaged hooking and catching edges defining a hollow generally cylindrical nest having a substantially closed curved surface, each nest extending longitudinally substantially the length of said shield;
      3. a longitudinally extending heat transfer conduit resident within each nest, retained therewithin by circumferential pressure exerted radially inwardly thereon by portions of said engaged arcuate hooking and catching edges defining said nest;
   (d) first heat insulative spacer means for retaining said interior conduit within and spaced from said annular shield;
   (e) second heat insulative spacer means for retaining said annular shield within and spaced from said exterior conduit;
   (f) radiation shields concentric with said interior conduit and interposed between said interior conduit and said annular heat transfer shield, said first insulative spacer means passing therethrough; and
   (g) radiation shields concentric with said exterior conduit and interposed between said exterior conduit and said annular heat transfer shield, said second heat insulative spacer means passing therethrough.

2. The cryogenic fluid transfer line of claim 1 wherein said arcuate members are extruded, wherein said arcuate catching edges are extruded as part of their associated arcuate members and comprise:
   (a) an arcuate portion defining a circularly concave face in a longitudinally extending edge of said associated arcuate member, said concave face subtending an angle less than one hundred eighty degrees;
   (b) a first tab portion defining a terminus of said concave face, extending away from said arcuate portion at an oblique angle to said concave face; and
   (c) a bumper portion extending transversely from said first tab portion, at a position thereon remote said concave face, in the direction said concave face extends from said first tab;
and wherein said arcuate hooking edges are extruded as part of their associated arcuate members and comprise:
   (d) an arcuate portion defining a circularly concave face in a longitudinally extending edge of said associated arcuate member, said concave face having a radius substantially the same as said first arcuate member concave face and subtending an angle less than that subtended by said first arcuate member concave face;

(e) a second tab portion defining a terminus of said hooking edge concave face, extending away from said arcuate portion outwardly with respect to said concave face and at an angle thereto which is substantially the same as the oblique angle at which said first tab extends away from said arcuate catching edge concave face;

wherein when said hooking and catching edges are engaged, said second tab is contiguous with said first tab and abuts said bumper portion extending from said first tab, and said convex faces of each pair of hooking and catching edges define a nest.

3. The fluid transfer line of claim 2 wherein radius of said convex faces defining said nest is slightly less than outside diameter of said heat transfer conduit resident therewithin to affect an interference fit between said nest and said conduit.

4. The fluid transfer line of claim 3 wherein said convex faces of each said pair of arcuate hooking and catching edges, defining the area of contact between said nest and said heat transfer conduit, together subtend an angle of only slightly less than three hundred sixty degrees.

5. The cryogenic fluid transfer line of claim 4 wherein said second insulative spacer means further comprises:
   (a) a plurality of pairs of lugs, each pair extending radially outwardly from the exterior of one of said arcuate members and extending longitudinally the length of said arcuate member; and
   (b) at least one non-metallic heat insulative spacer slideably resident within each said pair of lugs, each said spacer having a surface, facing outwardly away from said shield, defined by an arc portion of a circle which, if drawn would define a plane parallel to the longitudinal axis of said outer conduit.

6. The cryogenic fluid transfer line of claim 5 wherein said first insulative spacer means further comprises:
   (a) a plurality of tubular feet extending outwardly from said interior conduit; and
   (b) a tubular non-metallic heat insulative spacer resident within each said tubular foot and extending outwardly therefrom.

* * * * *